(12) United States Patent
Zellner et al.

(10) Patent No.: US 6,748,052 B2
(45) Date of Patent: *Jun. 8, 2004

(54) MULTIMEDIA EMERGENCY SERVICES

(75) Inventors: Samuel N. Zellner, Dunwoody, GA (US); Mark J. Enzmann, Roswell, GA (US); Robert T. Moton, Jr., Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/402,517

(22) Filed: Mar. 28, 2003

(65) Prior Publication Data

US 2003/0190017 A1 Oct. 9, 2003

Related U.S. Application Data

(63) Continuation of application No. 09/740,374, filed on Dec. 19, 2000, now Pat. No. 6,567,502.

(51) Int. Cl.⁷ .............................................. H04M 11/00
(52) U.S. Cl. ........................ 379/45; 379/37; 379/102.01
(58) Field of Search .............................. 379/45, 37, 38, 379/39, 40, 102.01, 102.02, 106.02

(56) References Cited

U.S. PATENT DOCUMENTS

| | | | |
|---|---|---|---|
| 4,760,593 A | 7/1988 | Shapiro et al. | |
| 4,918,717 A | 4/1990 | Bissonnette et al. | |
| 5,333,171 A | 7/1994 | Wang et al. | |
| 5,438,568 A | 8/1995 | Weisser, Jr. | |
| 5,589,818 A | 12/1996 | Queen | |
| 5,717,379 A | 2/1998 | Peters | |
| 5,812,054 A | 9/1998 | Cohen | |
| 5,884,032 A | 3/1999 | Bateman et al. | |
| 6,094,134 A | 7/2000 | Cohen | |
| 6,271,752 B1 | 8/2001 | Vaios | |
| 6,292,542 B1 | 9/2001 | Bilder | |
| 6,295,346 B1 | 9/2001 | Markowitz | |

(List continued on next page.)

OTHER PUBLICATIONS

An online article titled, "Samsung integrate digital camera and phone," published on Jul. 1, 2000, and retrieved from http://www.dpreview.com/news/0007/00070101samsungdigiphone.asp on Aug. 10, 2000 (two pages).

(List continued on next page.)

*Primary Examiner*—Stella Woo
(74) *Attorney, Agent, or Firm*—Kirkpatrick & Lockhart LLP

(57) ABSTRACT

A system and method for remotely controlling one or more monitoring devices in a user's household in the event of emergency so as to more productively monitor the emergency situation on a real-time basis. The monitoring devices may include a number of multimedia instruments such as a telephone with an answering machine, a computer with a built-in digital camera, a video recording device, a cellular phone with an integrated digital camera, etc. An emergency service provider may remotely activate the monitoring devices in the user's vicinity upon receiving an emergency help request from the user, and receive the information sent by the monitoring devices to enable the service personnel to plan appropriate response to the emergency at hand. Such an arrangement allows for better monitoring of the user's vicinity in an emergency situation without the need for prolonged user participation in narrating or describing the emergency situation. Further, the emergency service provider may obtain a better picture of the emergency and its impact by controlling appropriate monitoring devices available in the user's vicinity. The remote activation and control of a monitoring device may be accomplished via the Internet.

20 Claims, 4 Drawing Sheets

U.S. PATENT DOCUMENTS

| | | |
|---|---|---|
| 6,302,844 B1 | 10/2001 | Walker et al. |
| 6,330,499 B1 | 12/2001 | Chou et al. |
| 6,356,841 B1 | 3/2002 | Hamrick et al. |
| 6,442,241 B1 * | 8/2002 | Tsumpes .................. 379/45 |
| 6,504,909 B1 | 1/2003 | Cook et al. |
| 6,519,241 B1 | 2/2003 | Theimer |
| 6,553,106 B1 | 4/2003 | Gould et al. |
| 6,563,910 B2 | 5/2003 | Menard et al. |
| 6,567,502 B2 * | 5/2003 | Zellner et al. ............ 379/45 |

OTHER PUBLICATIONS

Daniel L. Lough et al., "A Short Tutorial on Wireless LANs and IEEE 802.11," retrieved from http://computer.org/students/looking/summer97/ieee802.htm on Sep. 7, 2000 (five pages).

Description of ITI Wireless Intrusion Sensors, pp. 1–3, available on Feb. 22, 2000 at http://www.flex.com/~digital/itwis.html.

U.S. patent application No. 09/586,065 filed Jun. 2, 2000.
U.S. patent application No. 09/586,067 filed Jun. 2, 2000.
U.S. patent application No. 10/631,549 filed Jul. 31, 2003.

* cited by examiner

MULTIMEDIA EMERGENCY SERVICES

CROSS REFERENCE TO RELATED APPLICATIONS

The present application is a continuation of and claims priority pursuant to 35 U.S.C. §120 to pending application Ser. No. 09/740,374, filed Dec. 19, 2000 U.S. Pat. No. 6,567,502.

STATEMENT REGARDING FEDERALLY SPONSORED RESEARCH OR DEVELOPMENT (Not Applicable)

BACKGROUND OF THE INVENTION

1. Field of the Invention

The present invention broadly relates to providing emergency services (e.g., the police services) to the public, and more particularly, to a system and method of providing emergency services wherein the emergency service provider (e.g., the police) gets control of one or more monitoring devices in the vicinity of a user requesting emergency help.

2. Description of the Related Art

FIG. 1 illustrates a typical prior art emergency reporting arrangement using a telephone 10. A person or user 12 in need of emergency help dials a designated emergency reporting number (e.g., '911') to connect to an emergency service center (ESC) 14. The emergency service center 14 may be a 911-response center, a police station, a hospital, a fire station, a combination of these places or any other location equipped for dispatching emergency relief. A carrier network 16 may electrically connect the telephone 10 to a receiving apparatus (e.g., an operator headset receiver) at the ESC 14. The carrier network 16 may include, individually or in combination, the plain old telephone system (POTS), the more advanced public switched telephone network (PSTN), or a wireless communication network (e.g., a cellular telephone network) when the telephone 10 is, for example, a cellular phone ("cell phone").

Instead of dialing all the digits contained in the designated emergency reporting number (e.g., '9','1','1'), a user may instead "speed dial" the number by programming a single key on the telephone 10. In this manner, the user need not press individual digits of the phone number, but, instead, may need to press only a pre-marked speed dial key. Some modern cell phones come equipped with a "button" or key on their keypads that is dedicated to dial a predetermined emergency phone number (e.g., '911').

Thus, typically, the user 12 requests emergency help over the phone 10. When the user 12 dials the emergency phone number (e.g., '911'), an operator at the ESC 14 answers the phone and asks the user 12 to state the user's name, the address or place of the emergency, the nature of the emergency, the cause of the problem, etc. In response, the user 12 has to provide the requested information in sufficient detail so as to enable the emergency service personnel to locate the user and the place of the emergency and also to come prepared to the emergency location depending on the nature of the emergency. For example, in case of a robbery, the user 12 may need to inform the operator at the ESC 14 of the seriousness of the emergency so that the police or other emergency service personnel may arrive at the place of trouble with adequate safety measures in place.

However, it is easily observed that the user 12 may not always be able to adequately describe the user's vicinity during the emergency. For example, in the robbery situation described above, the user may not be in a safe position to talk at length (about the robbery) over the phone 10 or, alternatively, the user 12 may simply be so dumbfounded by the chain of events as to not be able to effectively narrate the urgency of the situation or of the surroundings to the ESC 14 operator. The user may not even be physically capable of narrating the user's vicinity, for example, when the user suffers a heart attack and wishes just to inform the emergency service provider (e.g., the police or the hospital) of the user's condition without further discussion or details.

The user 12 may have one or more monitoring devices (not shown) in the user's vicinity or in the user's household or dwelling 17 to record or monitor certain situations. For example, the user 12 may be wearing a monitor/transmitter that can record and transmit (upon request) the user's current blood pressure. Alternatively, the user 12 may have a video camera in the user's vicinity which, when activated, may record and transmit visual images depicting the user's surroundings at the time of the camera activation, thereby providing the viewer with a visual description of the user's vicinity. For example, in a robbery situation, the video camera may capture and transmit the images of the events occurring in the user's vicinity. These events may include the act of robbery, the physical looks/descriptions and location (if possible) of the robber and any accomplices, the extent of physical injury to the user or any other party, the location of any exit route or stairways in the building, etc.

However, many monitoring devices may not be already active at the time of emergency, and must be activated by the user or someone else before any condition in the user's vicinity can be monitored. Furthermore, in many emergency situations (e.g., under threat of physical safety or under an onset of a life-threatening emergency), the user may not be physically capable of accessing the monitoring device to activate it, even if the user wishes to do so. Also, the user 12 may not even be able to speak or narrate his/her emergency situation when connected to the operator at the ESC 14. Additionally, the ESC 14 may have a finite number of incoming telephone lines. In that situation, because of the circuit-switched nature of telephone communications, the person placing the emergency call may end up receiving a line "busy" signal instead of an operator's voice. In other words, the ESC 14 may not immediately attend to the user's phone call in the event of a large number of distress calls to the ESC 14. This may not be desirable, especially when the caller's situation demands prompt and instant attention.

It is therefore desirable for an emergency service provider to be able to remotely control one or more monitoring devices in the user's vicinity when the user sends an emergency help request. Such an arrangement allows for better monitoring of the user's vicinity in an emergency situation without the need for prolonged user participation in narrating or describing the emergency situation. Further, the emergency service provider may obtain a better picture of the emergency and its impact by controlling appropriate monitoring devices available in the user's vicinity. The availability of modern high-speed data processors and the continually growing popularity of the Internet make it desirable to perform remote monitoring—including activation and deactivation of various monitoring devices—of an emergency condition using the Internet or other IP (Internet Protocol) network. It may also be desirable for the emergency service provider to offer a subscription-based or usage-based emergency monitoring service.

SUMMARY OF THE INVENTION

The present invention contemplates a method of monitoring the vicinity of a user requesting emergency help. The method comprises receiving an emergency help request from the user; and remotely controlling one or more monitoring devices in the user's vicinity in response to the emergency help request from the user. The monitoring devices may include a number of multimedia instruments such as a telephone with an answering machine, a computer with a built-in digital camera, a video recording device, a cellular phone with an integrated digital camera, etc. The emergency help request from the user is received at an emergency service center (ESC) which then establishes an individual communication session with each monitoring device to receive the monitored information therefrom. The ESC may determine what parameters (e.g., sight, sound, blood pressure, heart rate, etc.) a monitoring device can monitor, the type of the monitored information (audio information, video information, etc.), and the form (data packets, analog signals, etc.) in which the monitored information is available from the monitoring device.

In one embodiment, the ESC may remotely query each monitoring device to determine what capabilities that device has. Based on the determination of the device capabilities, the ESC may then remotely activate the appropriate monitoring device to obtain the information needed to allow the ESC personnel to prepare the best possible response to tackle the emergency at hand. The information about device capabilities may be obtained from a database within the ESC. Alternatively, the queried device may send a URL (Uniform Resource Locator) address for a web site from which the ESC can obtain pertinent device-specific information.

The present invention also contemplates a system for monitoring the vicinity of a user requesting emergency help. The system comprises one or more monitoring devices installed in the vicinity of the user, wherein at least one of the one or more monitoring devices is configured to transmit an emergency help request from the user; and an emergency service center (ESC) in communication with the one or more monitoring devices, wherein the ESC is configured to receive the emergency help request and to remotely control the one or more monitoring devices in response thereto. The ESC may be connected to the monitoring devices via a carrier network, which may include, individually or in combination, the plain old telephone system (POTS), the more advanced public switched telephone network (PSTN), or a wireless communication network (e.g., a cellular telephone network), depending on the type of monitoring device communicating with the ESC. The ESC may also communicate with a monitoring device via the Internet.

The present invention further contemplates a method of providing emergency services. The method comprises offering a fee-based emergency monitoring service (EMS); receiving an emergency help request from a subscriber of the EMS; and remotely controlling one or more monitoring devices in the subscriber's vicinity in response to the emergency help request from the subscriber. A provider of the EMS may initially receive the monitored data from the remote monitoring devices, and may then transfer the data to an emergency service center (ESC) serving the region in which the subscriber's household is located. Thus, the EMS provider may act as an intermediary between the subscriber and the ESC. In an alternative arrangement, the ESC may itself be the EMS provider.

The remote activation of the monitoring devices and the remote reception of the monitored information sent by the monitoring devices enable emergency service personnel to plan an appropriate response to the emergency at hand. Such an arrangement allows for better monitoring of the user's vicinity in an emergency situation without the need for prolonged user participation in narrating or describing the emergency situation. Further, an emergency service provider may obtain a better picture of the emergency and its impact by controlling appropriate monitoring devices available in the user's vicinity. The remote monitoring of the user's vicinity at the time of emergency is also useful to expeditiously gauge the severity of the emergency, and, hence, to prepare an adequate response to help the user in need of emergency assistance.

BRIEF DESCRIPTION OF THE DRAWINGS

Further advantages of the present invention may be better understood by referring to the following description taken in conjunction with the accompanying drawings, in which.

DETAILED DESCRIPTION OF PREFERRED EMBODIMENTS

It is noted at the outset that the numeral 17 is primarily used hereinbelow to indicate that portion of the user's actual household or dwelling which is to be monitored when an emergency is reported, i.e., that portion of the user's household which comprises the relevant vicinity for the user in the time of emergency. Thus, in some situations (e.g., when the user 12 is having a heart attack), the term "household" (as represented by numeral 17) may simply refer to a single room or office within the user's actual household. On the other hand, in some other situations (e.g., when the user's household is robbed or burglarized), numeral 17 may represent the user's entire household, including different rooms, offices, basement, etc., because of the need to monitor different locations, for example, to assess damage or to locate any culprit hiding within the household. Furthermore, the user 12 may not even be physically present in the user's household 17 that is to be monitored. For example, in case of a burglary, the user 12 may be calling the police or other appropriate ESC 14 from a place different from the actual location of burglary-i.e., the user's household. Here, the user's "relevant vicinity" may still include the user's actual household even if the user 12 is not physically present there. In summary, it is noted that the terms "household" and user's "vicinity" are used interchangeably hereinbelow depending on the context of reference and both may be construed to be represented by the single numeral 17.

Figure 1:
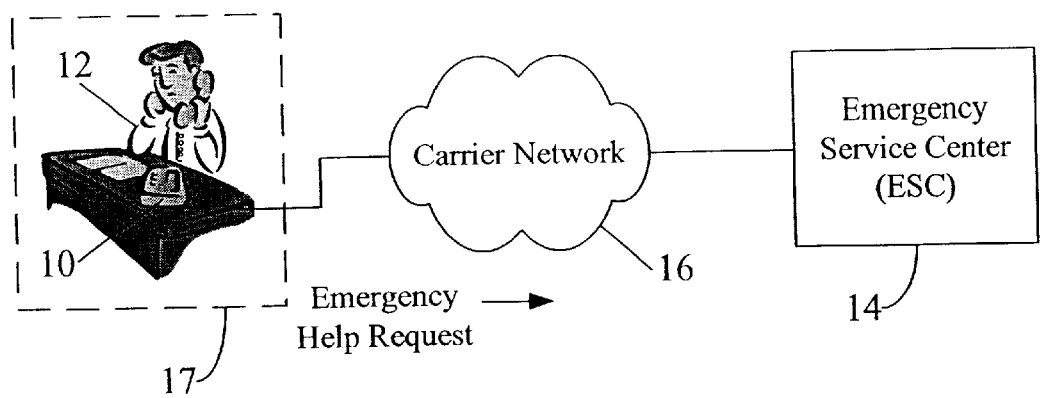
FIG. 1 illustrates a typical prior art emergency reporting arrangement using a telephone.
Figure 2:
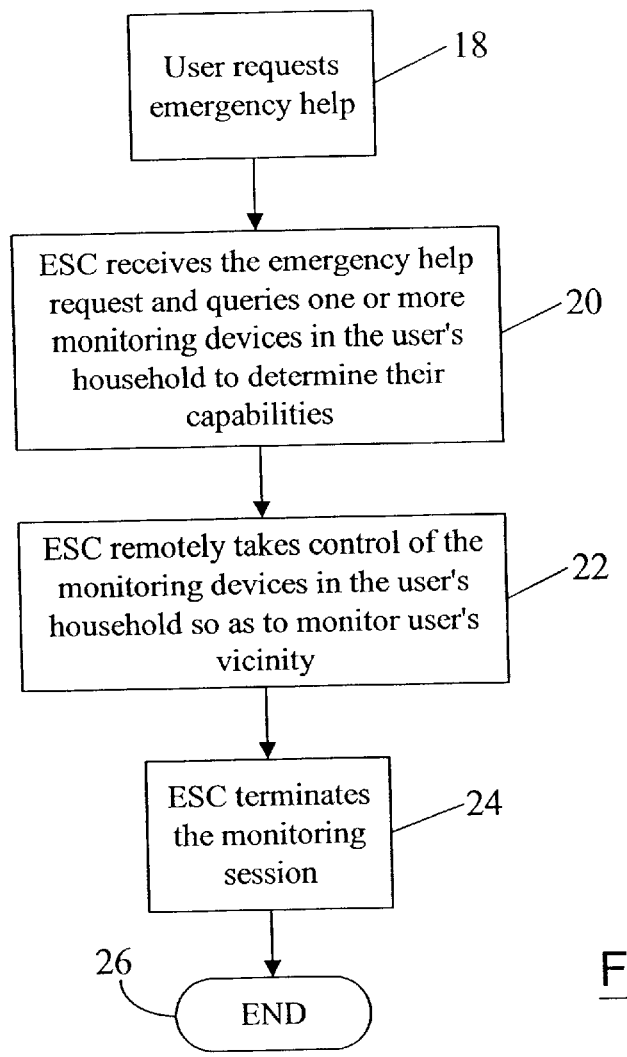
FIG. 2 is a general flow diagram of a method of remotely controlling various monitoring devices according to the present invention.

FIG. 2 is a general flow diagram of a method of remotely controlling various monitoring devices according to the present invention. As shown in FIG. 2, the user 12 initially requests emergency help at block 18. Typically, the user 12 calls the emergency service center (ESC) 14 at a predesignated emergency telephone number (e.g., '911'). At block 20, the ESC 14 receives the emergency help request from the user 12 and queries (or sends commands to) one or more monitoring devices (which are in the user's vicinity) in the user's household 17 to determine what capabilities those devices have. For example, the ESC 14 may determine what parameters (e.g., sight, sound, blood pressure, heart rate, etc.) a monitoring device can monitor, the type (e.g., audio information, video information, etc.) and the form (e.g., data packets, analog signals, etc.) in which the monitored information is available from the monitoring device, etc.

After determining the capabilities of various monitoring devices in the user's household 17, the ESC 14 remotely takes control of those devices at block 22 so as to monitor the user's vicinity during the emergency. In one embodiment, the operator (at the ESC 14) answering the user's phone call may manually activate the remote controlling functionality depending on a number of factors, e.g., whether the user 12 has subscribed to the remote emergency monitoring service, whether the nature of the emergency (as explained by the user 12 over the phone 10) requires remote monitoring, whether there is any monitoring device in the vicinity of the user requesting emergency help and whether that monitoring device is capable of being controlled remotely, etc. In an alternative embodiment, the remote controlling of various monitoring devices may be performed automatically by the ESC 14 (in hardware and/or software) once the emergency call from the user 12 is received at the ESC 14. As discussed hereinbelow, the user 12 may need to "register" with the emergency monitoring service various monitoring devices in the user's entire household 17 so that the ESC 14 may have a record of which devices in the user's household are capable of remote activation and control.

The duration of remote monitoring may be either manually determined by the operator at the ESC 14 or automatically by the ESC 14 after a predetermined time (e.g., 3 minutes) has elapsed since activation of the remote monitoring functionality at the ESC 14. The duration of remote monitoring may depend, for example, on the user's description of the emergency or on the content and quality of the information received from the remote monitoring devices that can enable other emergency service personnel to effectively plan emergency assistance. The ESC 14 terminates or discontinues remote monitoring at blocks 24, 26 and, based on the monitored data or information, provides appropriate emergency assistance (e.g., dispatching firefighters or police to the location of the emergency, or informing the user 12 to contact another emergency help center, etc.).

The present invention thus alleviates the need for the user 12 to explain the emergency at length to an operator at the ESC 14. Instead, the ESC 14 may itself remotely monitor the emergency situation and make a speedy determination of what responsive measures are required to tackle the emergency. In one embodiment, the ESC 14 may continue monitoring the user's vicinity for a predetermined time even after the user 12 has hung up the phone 10 after reporting the emergency. As discussed hereinbelow, the ESC 14 may also offer the remote emergency monitoring service to the user 12 for a fee or charge. Therefore, under the system and method of the present invention, the burden on the user 12 to maintain the telephone contact with the ESC 14 and also to effectively narrate the emergency condition to the ESC operator is substantially reduced.

Figure 3:
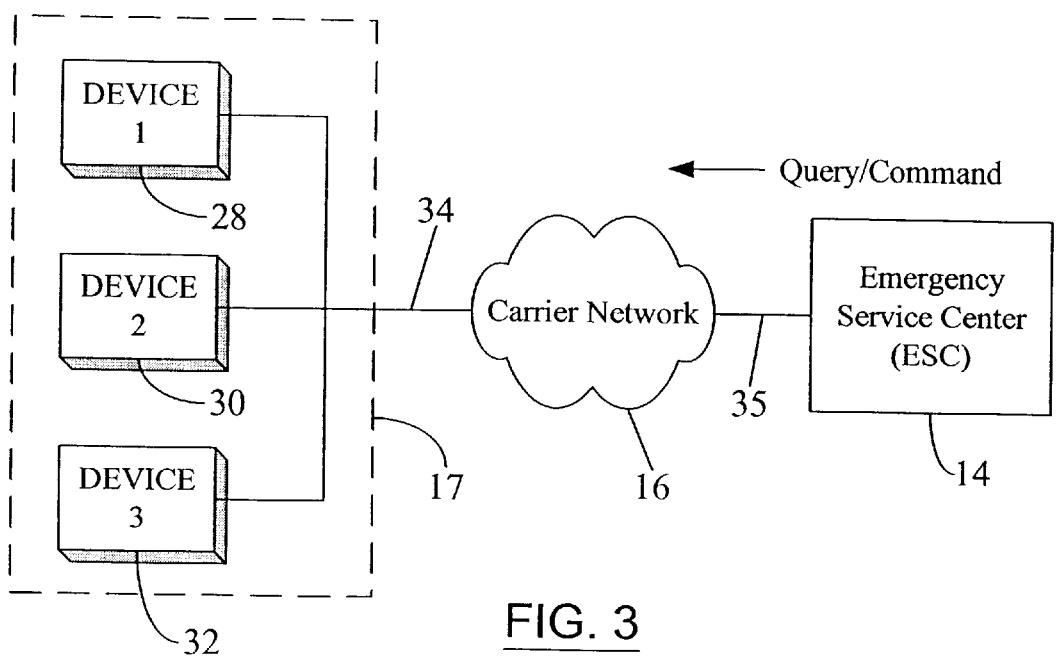
FIG. 3 illustrates a general arrangement wherein the emergency service center remotely controls three monitoring devices in the user's household.

FIG. 3 illustrates a general arrangement wherein the ESC 14 remotely controls three monitoring devices 28, 30, 32 in the user's household 17. The monitoring devices are shown connected to the carrier network 16 via a first connecting link 34. As noted hereinbefore, the carrier network 16 may include, individually or in combination, the plain old telephone system (POTS), the more advanced public switched telephone network (PSTN), or a wireless communication network (e.g., a cellular telephone network), depending on the type of the device communicating with the ESC 14. The first connecting link 34 may be capable of carrying voice and data signals from the devices 28, 30, and 32. Furthermore, it may be desirable to carry voice and data simultaneously over the first connecting link 34 to better monitor the emergency situation. For example, an operator at the ESC 14 may talk with the user 12 simultaneously while viewing video of the user's vicinity during an emergency call. Similarly, the ESC 14 may be connected to the carrier network 16 via a second connecting link 35, which can be similar in type to the first connecting link 34. Some examples of the first and the second connecting links 34, 35 include a regular telephone line cable, an ISDN (Integrated Services Digital Network) line, an ADSL (Asymmetrical Digital Subscriber Line) line, an optical fibre link, a radio link (e.g., when the carrier network 16 supports wireless communication), a cable modem link, etc.

In the arrangement illustrated in FIG. 3, the monitoring device 28 may be a fax machine with a built-in telephone (similar to the telephone 10) unit, the monitoring device 30 may be a video camera unit, and the monitoring device 32 may be a telephone answering machine. Additional monitoring devices (e.g., a digital camera, or a computer with a built-in camera unit, or a telephone with built-in video camera and data ports) may also be connected to the first connecting link 34 to obtain audio and/or video information from the user's vicinity in the time of emergency.

The operator at the ESC 14 receiving an emergency notification from the user 12 (e.g., as a voice message over a telephone, or as an electronic mail message over the Internet) may send a query message to the user's household 17 (i.e., to the monitoring devices 28, 30, 32) over the second connecting link 35. In one embodiment, the query message from the ESC 14 may simply be a sequence of predetermined digits or an alphanumeric message. For example, the sequence "A394BEH6" may be transmitted as a group of DTMF (Dual Tone Multi Frequency) signals constituting the query message from the ESC 14. Each ESC 14 offering the remote monitoring service according to the present invention may be assigned a different combination of letters and numerals for the query messages. Alternatively, the user 12 may select a user-specific query message and notify the ESC 14 to send that query message to the devices in the user's household 17. As mentioned hereinbelow, the user 12 may then program the monitoring devices 28, 30, 32 to be responsive to the specific query message selected by the user. Still further, the user 12 may select a different query message for each monitoring device 28, 30, 32. In that event, the ESC 14 may need to transmit three separate query messages to the user's household 17—one for each respective monitoring device.

In one embodiment, appropriate hardware at the ESC 14 may be configured to automatically send the query to the monitoring devices 28, 30, 32 upon receiving the emergency notification from the user. The monitoring devices 28, 30, 32 may be programmed during manufacture or by the user 12 at a later time to receive the query from the ESC 14 and to responsively transmit device-specific information to the ESC 14. The device-specific information may include, for example, the type of the device, an indication of the functional capabilities of the device, a list of commands or electronic "keys" or passwords that can control various features of the device, the make, model, and manufacturer of the device, etc.

The ESC 14 determines, based on the device-specific information received from the respective monitoring device 28, 30, or 32, whether the device needs to be remotely activated for monitoring the user's vicinity and what feature or features of the device are to be activated. For example, when the monitoring device 32 is an answering machine, that answering machine may transmit, in response to a query from the ESC 14, a list or menu of remote operation commands that the ESC 14 may use to activate corresponding functionality remotely. Thus, upon receiving the device-specific information from the answering machine 32, the ESC 14 may, for example, send the appropriate code or command that remotely instructs the answering machine 32 to turn on its built-in microphone to monitor conversation, sound, or noise in the user's vicinity 17. Such monitoring may be desirable when, for example, the user 12 is reporting a burglary in the household 17 or when somebody in the user's household 17 is under physical threat of violence or attack.

The foregoing discusses one method in which a communication session with each of the monitoring devices 28, 30, and 32 is established after device capabilities are determined in response to a query from the ESC 14. The monitored information may be sent from the respective monitoring device as long as the communication session remains established between the device and the ESC 14. As discussed hereinbefore, the devices 28, 30, and 32 may need to be remotely activated prior to establishing the communication session, i.e., prior to commencing remote monitoring. In an alternative embodiment, instead of sending one or more queries to the user's household 17, the ESC 14 may send one or more commands to the corresponding monitoring devices 28, 30, and 32. Here, a single command may be sent to all of the monitoring devices 28, 30, and 32. Alternatively, a different command may be sent to each monitoring device 28, 30, and 32. A command from the ESC 14 may be in a form similar to that for the query. Thus, for example, a command may include alphanumeric characters and this alphanumeric command may be transmitted as a set of DTMF (Dual Tone Multi Frequency) tones.

A command is typically sent when the ESC 14 is already aware of device capabilities or device-specific information for the device to be activated. The ESC 14 may obtain such information prior to the emergency by requesting the user 12 to register such information with the ESC 14 or by initially querying the devices 28, 30, and 32 after the user 12 signs-up for the remote monitoring service provided by the ESC 14 (but before any emergency call is received from the user 12). After determining whether to activate a particular monitoring device 28, 30, or 32 (based on the information about device capabilities), the ESC 14 sends a command to the corresponding monitoring device to activate the device. Upon device activation, a communication session is established between the respective monitoring device 28, 30, or 32, and the ESC 14. The ESC 14 thereafter receives monitored information from the activated device as discussed hereinbefore.

Figure 4:
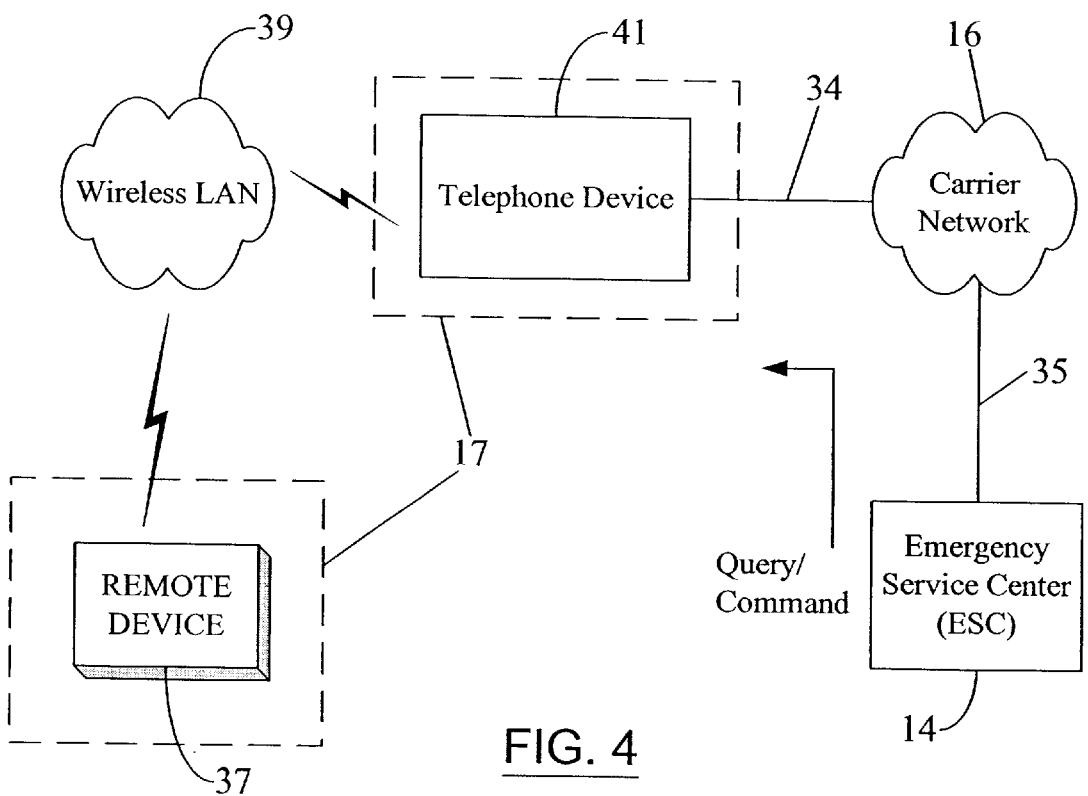
FIG. 4 depicts an arrangement wherein the emergency service center remotely controls a monitoring device connected to a wireless LAN.

FIG. 4 depicts an arrangement wherein the emergency service center 14 remotely controls a monitoring device 37 connected to a wireless LAN (Local Area Network) 39. The remote monitoring device 37 may communicate with the ESC 14 via a host device 41, which can be, for example, a telephone device or a computer (as discussed hereinbelow with reference to FIG. 6). The telephone device 41 may include a regular telephone with wireless communication capability (e.g., a cordless telephone unit) and with or without additional functionalities integrated therein. Such additional functionalities may include, for example, answering machine functionality, digital camera functionality, etc. In the arrangement illustrated in FIG. 4, messages from the ESC 14 are sent over the carrier network 16 and the first connecting link 34, and are initially received by the telephone device 41. The telephone device 41 then wirelessly forwards the received message over the wireless LAN 39 to the remote monitoring device 37. Similarly, a message originating from the remote monitoring device 37 is initially sent to the telephone device 41 via the wireless LAN 39. Thereafter, the telephone device 41 forwards the message to the ESC 14 over the carrier network 16.

The remote monitoring device 37 may be a wearable transceiver (e.g., in the form of a wrist watch or necklace or wrist band) that monitors one or more biological parameters, e.g., the user's blood pressure, or the user's heart rate. The remote monitoring device 37 may include a digital camera or other video surveillance device to capture and transmit video data obtained from the user's vicinity 17 to the ESC 14. In one embodiment, the wireless LAN 39 connecting the remote device 37 and the host device 41 may provide device-to-device connectivity based on the Bluetooth™ technology or on the 802.11 protocol from the IEEE (Institute of Electrical and Electronic Engineers). Communication over a Bluetooth-based or an 802.11-based network is desirable because of lack of directionality in a wireless transmission that is based on radio technology. On the other hand, when the wireless LAN 39 connects the two devices—i.e., the host device 41 and the remote monitoring device 37—using a directional link, e.g., an infrared link similar to that used by typical television or audio remote controls, those two devices may not get freedom of movement while the communication between them is in progress. Such a restriction on freedom of movement may not be desirable in the event of, for example, a life-threatening emergency.

A distinguishing feature in FIG. 4 is the wireless access to the monitoring device 37. Otherwise, the functionality accomplished by the arrangement in FIG. 4 is similar to that explained hereinbefore with reference to FIG. 3. In other words, for the arrangement in FIG. 4, functions such as transmission of a query or command by the ESC 14, reception by the ESC 14 of a response from the remote device 37, ESC's remote activation of the monitoring device 37, ESC's establishment of a communication session with the monitoring device 37, etc., are performed in a manner similar to that discussed hereinbefore with respect to FIG. 3. Therefore, additional discussion of such similar functions is omitted to prevent repetition.

Figure 5:
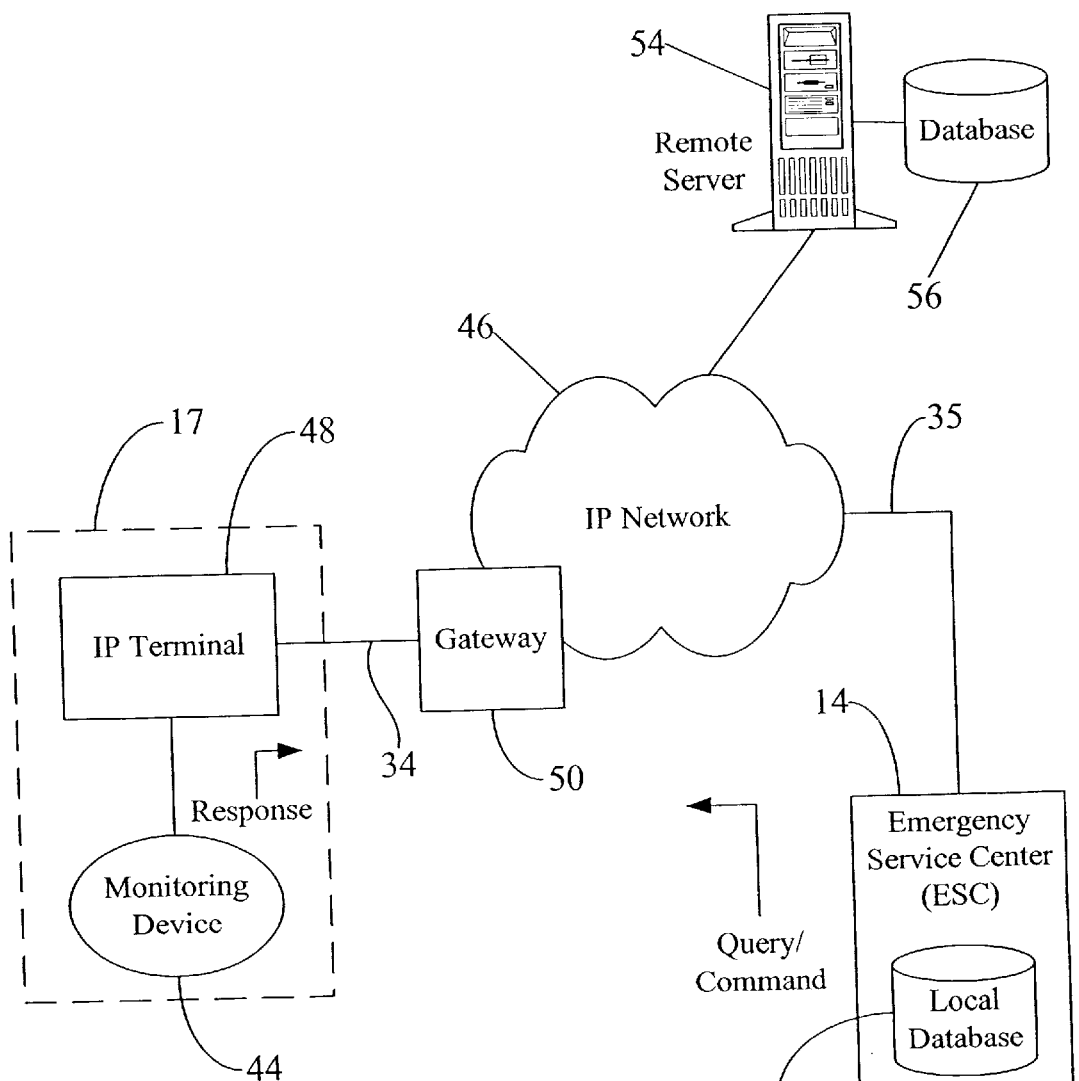
FIGS. 5 and 6 show arrangements wherein the emergency service center remotely controls one or more monitoring devices via an IP network.

FIG. 5 shows an arrangement wherein the emergency service center 14 remotely controls a monitoring device 44 via an IP network 46. The IP network 46 includes any TCP/IP-based (Transmission Control Protocol/Internet Protocol) data communication network such as, for example, the world wide web portion of the Internet. The monitoring device 44 is connected to the IP network 46 via an IP terminal 48, which can be any device (e.g., a personal computer) capable of TCP/IP-based, communication. The monitoring device 44 may transmit digital data (which includes the monitored information as well as the response to a query from the ESC 14) to the IP terminal 48, which, in turn, may generate suitable TCP/IP data packets from the received data. The monitoring device 44 may be external to the IP terminal 48. Alternatively, the monitoring device 44 may be a part of the IP terminal 48 (e.g., built into the IP terminal 48). For example, in the embodiment illustrated in FIG. 5, the monitoring device 44 may include a digital camera attached to a personal computer (as an IP terminal 48). On the other hand, the personal computer (i.e., the IP terminal 48) may have built-in hardware to perform telephone device functionality. This telephone device can thus function as a monitoring device 44.

Figure 6:
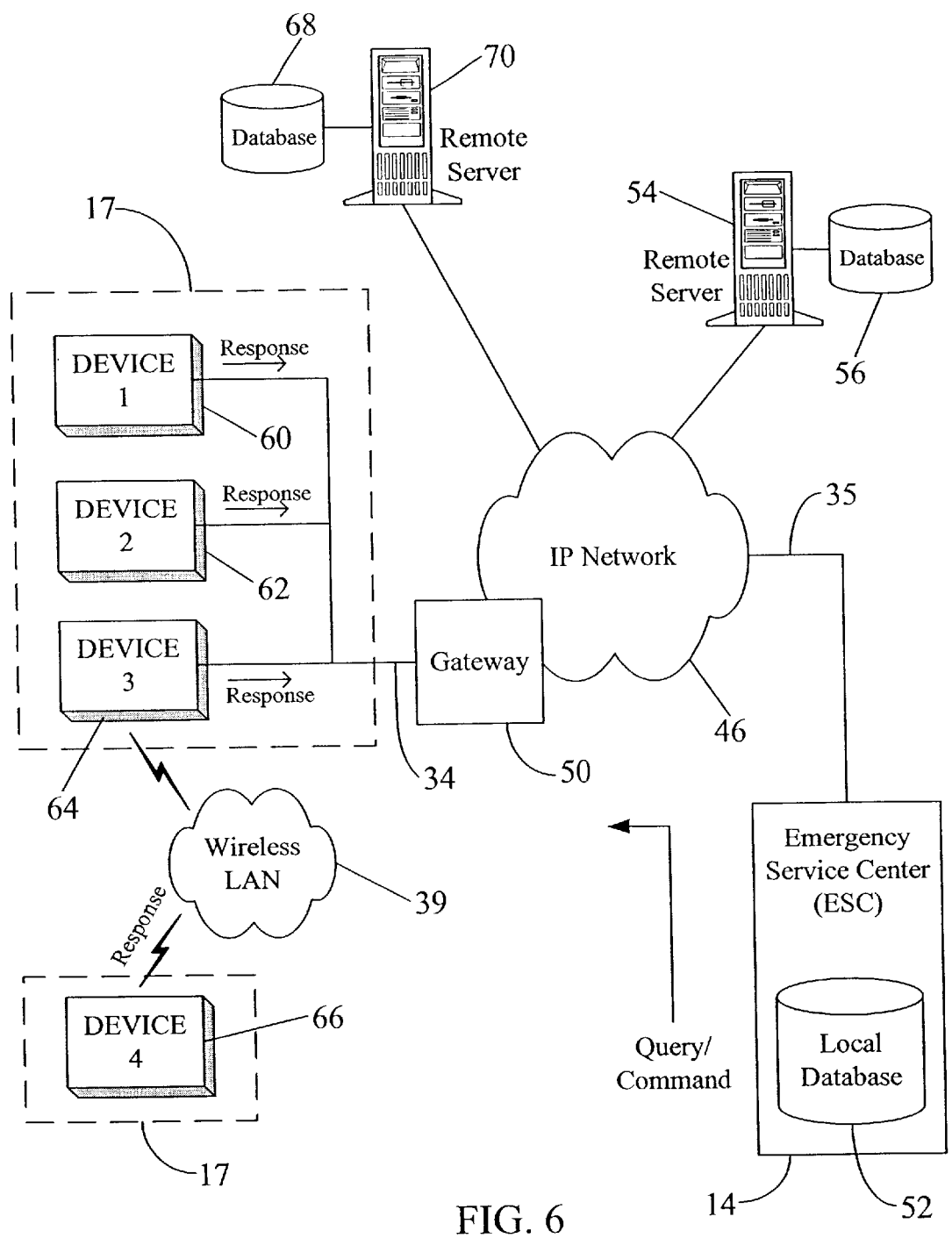

The IP terminal 48 is shown connected to the IP network 46 through a gateway computer or server (simply, "the gateway") 50. In one embodiment, the gateway 50 may be owned and operated by an ISP (Internet Service Provider) that provides Internet connectivity to the IP terminal 48. The first connecting link 34 between the IP terminal 48 and the gateway 50 may be an ADSL line, a cable modem link, or any other suitable link as discussed hereinbefore. More than one IP terminal 48 in the user's household 17 may also be connected to the gateway 50 as illustrated in FIG. 6. Alternatively, a single gateway 50 may support multiple IP terminals 48 from different households. The gateway 50 may also be configured to perform TCP/IP data packet routing and transfer functions. Additionally, the gateway 50 can also function as a firewall for secured communication and may block unauthorized queries to the user's household 17, thereby preventing device-specific information from being released to unscrupulous inquirers. The gateway 50 may be configured to identify queries from a specific authorized source, e.g., the ESC 14, and allow only those queries to reach the IP terminal 48 (and, hence, the monitoring device 44) in the user's household 17.

In one embodiment, the ESC 14 may maintain a database 52 physically located within the ESC facility on a personal computer or a server (not shown). The database 52, which is accessible to the ESC personnel, may contain device-specific information and device characteristics or profile data for a large number of monitoring devices from various manufacturers. Here, the monitoring device 44 may simply report its model and manufacturer information to the ESC 14 in response to a query from the ESC 14. The ESC 14 may then access and search the database 52 to determine pertinent device-specific information therefrom prior to establishing a communication session with the monitoring device 44 and prior to reception of any monitored data from the device 44.

In an alternative embodiment, the monitoring device 44 may supply (e.g., in response to the query from the ESC 14) a URL (Uniform Resource Locator) to a remote website maintained by the manufacturer of the device 44. The website may reside on a remote server or computer 54 that also contains a device-specific information database 56 for one or more devices available from the same manufacturer. The URL may contain the web page address in, for example, a hypertext link format from which the device-specific information can be obtained from the manufacturer's website. Upon receipt of the URL, the ESC 14 may access the remote website to obtain necessary device-specific information or device profile prior to activating the device 44. In one embodiment, the monitoring device 44 may supply the URL information to the ESC 14 without waiting for a query from the ESC 14. The monitoring device 44 may be programmed to transmit the URL along with the emergency help request, if any, to the ESC 14.

The IP network 46 may employ a class of service scheme wherein TCP/IP data packets containing the emergency help request from the user 12, the queries and commands from the ESC 14, the responses (to the queries from the ESC 14) from various monitoring devices, and the monitored data receive higher preference than other data packets routed through the IP network 46. The gateway 50 on the user's side and any similar interface device on the ESC 14 side may be configured to recognize such emergency-related data packets and assign higher priorities to them. The IP network 46 itself may employ a routing algorithm that takes into account the nature of the message contained in a data packet to accordingly expedite the delivery of that data packet. The devices that originate such emergency-related TCP/IP data packets—i.e., the IP terminal 48, the monitoring device 44, a personal computer or server (not shown) at the ESC 14, and any emergency reporting device other than the IP terminal 48 or the monitoring device 44 used by the person requesting emergency help—may be configured to transmit an indication (e.g., a pre-assigned code or a designated digit sequence) as part of each data packet so as to identify the data packet as an emergency-related information packet that needs to be assigned higher priority by the IP network 46 or any other data transfer medium implementing the class of service scheme.

FIG. 6 shows an arrangement wherein the emergency service center 14 remotely controls more than one monitoring device via an IP network 46. FIG. 6 shows four monitoring devices 60, 62, 64, and 66 in the user's vicinity 17. Except for the presence of the wireless LAN 39 connecting two monitoring devices 64 and 66, the arrangement in FIG. 6 is similar to that in FIG. 5 in all essential aspects. For example, the ESC 14 may access more than one remote database, i.e., databases 56 and 68 at their respective servers 54 and 70 in FIG. 6, to obtain device-specific information for different devices in the user's household 17. The ESC 14 may need to access more than one remote database because all the monitoring devices 60–66 may not be from the same manufacturer. In other words, two or more manufacturers may maintain their own websites (e.g., on servers 54 and 70 in FIG. 6) from which device-specific data can be obtained. In addition to or in lieu of the remote databases 56 and 68, the arrangement in FIG. 6 may have a local database 52 at the ESC 14 that contains device-specific information for one or more monitoring devices 60, 62, 64, or 66.

It is thus noted that the discussion given hereinbefore with reference to FIG. 5 may be extended to cover the multiple-device arrangement in FIG. 6. However, the data transfer between the monitoring device 66 and the ESC 14 may require some additional explanation. The wireless connection between the monitoring devices 64 and 66 operates similarly in principle as that illustrated in FIG. 4. The "base" monitoring device 64 can be directly connected to the gateway 50 through the first connecting link 34. For example, the monitoring device 64 may be a computer unit with telephone functionality that can be remotely activated by the ESC 14. The first connecting link 34 may be a regular telephone line connecting the telephone (not shown) within the computer unit (not shown) to the gateway 50. Additionally, the device 64 may include a wireless port to wirelessly communicate with the monitoring device 66 via the wireless LAN 39. The monitoring device 66 may be, for example, a wireless digital camera, a wireless telephone equipped with a digital camera, or a biological parameter monitoring device (e.g., a wrist-watch transceiver that can monitor human blood pressure).

As discussed with respect to FIG. 4, the query, if any, from the ESC 14 is initially received by the "base" monitoring device 64 which then forwards the query message to the wirelessly-connected monitoring device 66. The receiving device 66 may send the response message to the monitoring device 64 via the wireless LAN 39. The monitoring device 64 then forwards the response message to the ESC 14 over the IP network 46. As noted hereinbefore, the data (including queries, commands, responses, and monitored data) communicated between the monitoring device 66 and the ESC 14 may be in the TCP/IP format. It is further noted that each monitoring device 60, 62, and 64 may include functionality similar to that available from the IP terminal 48 (FIG. 5) so as to allow direct connectivity to the gateway 50 without an additional interface. Some examples of such monitoring devices 60, 62, and 64 include a computer unit with telephone functionality (with or without the answering machine features), a digital camera or video recorder, a computer unit with built-in digital camera, etc.

Figure 7:
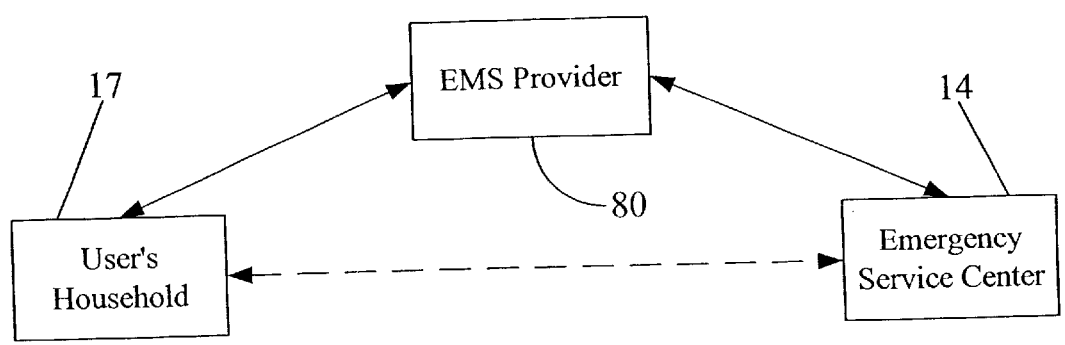
FIG. 7 represents a setup for providing the emergency monitoring service (EMS) according to the present invention.

FIG. 7 represents a setup for providing the emergency monitoring service (EMS) according to the present invention. Based on the foregoing methodology to remotely monitor emergency data, a commercial entity (e.g., a telephone service provider)—referred to hereinbelow as the "EMS provider" 80—may provide a fee-based emergency monitoring service to a group of subscribers. The EMS provider 80 may charge a flat fee, a renewable subscription fee, or a per-usage fee for the service. A public emergency assistance entity (e.g., a hospital or the police) may also provide the fee-based emergency monitoring service. In that event, the ESC 14 may itself be the EMS provider 80 as indicated by the dotted link directly connecting the user's household 17 with the ESC 14. In one embodiment, the emergency monitoring service may be a default service when a subscriber signs up for a telephone connection. The subscriber may, however, opt out or cancel the service at any time.

The subscriber may need to register with the EMS provider so that the EMS provider can identify the subscriber when an emergency help request (e.g., a "911" call) is received. The EMS provider may monitor the telephone digits (e.g., "9", "1", "1") dialed from the subscriber's location to determine whether to activate the emergency monitoring service. Furthermore, the subscriber may also have to notify the EMS provider as to which monitoring devices in the subscriber's household the EMS provider is authorized to remotely activate. Such a notification may occur, for example, when the subscriber first signs up or registers for the monitoring service. If a new monitoring device is later added in the subscriber's household 17, that monitoring device may be registered separately by the subscriber or the device may be configured to electronically communicate with the EMS provider 80 to register itself.

In one embodiment, the EMS provider 80 may act as an intermediary between the user's household 17 and the ESC 14 as illustrated in FIG. 7. The ESC 14 may be the one that serves the region in which the user's household 17 is located. Here, the EMS provider 80 may initially detect whether the user 12 has dialed for emergency help. In an alternative arrangement, to maintain the user's privacy, however, it may be desirable to have the user contact the EMS provider 80 in case of emergency. The EMS provider 80 may then activate one or more monitoring devices in the user's vicinity 17 in the same manner as that discussed hereinbefore (FIGS. 2–6) with reference to the ESC 14. In other words, the EMS provider 80 may perform functions similar to the ESC 14 and transfer all the monitored data to the ESC 14, which, then, can determine the next appropriate course of action. In this embodiment, the ESC 14 need not be capable of remote activation and monitoring capabilities. Instead, the required monitored data/information is obtained by the EMS provider 80, which then forwards the received data to the ESC 14.

The monitoring devices in the user's household 17 may be configured to "determine" whether the EMS provider 80 is authorized to obtain the monitored data. This may prevent unscrupulous third parties from receiving personal information about the user 12. The EMS provider 80 may supply a unique alphanumeric password or codeword for each household served by the EMS provider 80. The user/subscriber 12 may program the monitoring devices to "recognize" that password or codeword, thereby allowing only the authorized EMS provider 80 to activate various monitoring devices in the user's household 17 and to receive any monitored information therefrom. Instead of an individual identifier per household, each EMS provider may be assigned an identifier that remains the same for each household served by that EMS provider.

In one embodiment, the remote monitoring functionality may be automatically activated whenever the user/subscriber 12 dials a predetermined number (e.g., "911") for emergency help. Here, the EMS provider 80 may take and retain control of all the monitoring devices within the user's vicinity 17 for a predetermined duration or until the emergency help (from the ESC 14) arrives at the scene of emergency. In this embodiment, all the monitoring devices communicate with one another, with each monitoring device having a built-in "automatic consent" feature that allows the EMS provider 80 to remotely control all the monitoring devices in the user's vicinity 17 whenever any individual monitoring device in the user's vicinity 17 is used to send a request for emergency help. For example, a user in a car may dial "911" from the user's cell phone in the car, and the EMS provider 80, in response, may control all the monitoring devices in the car, including, for example, the car throttle control device or brakes so as to slow the car to prevent any further casualty when it may not be safe to allow the car driver to drive the car further (e.g., when the driver is having a heart attack while on the road). In an alternative embodiment, the monitoring devices may not communicate with one another, but the devices may be configured to be individually "locked" in the monitoring mode by the EMS provider 80. Only the EMS provider 80 may release the "locked" device after a predetermined event (e.g., dispatch of emergency help).

The foregoing describes a system and method for remotely controlling one or more monitoring devices in a user's household in the event of an emergency so as to more productively monitor the emergency situation on a real-time basis. The monitoring devices may include a number of multimedia instruments such as, for example, a telephone with an answering machine, a computer with a built-in digital camera, a video recording device, a cellular phone with an integrated digital camera, etc. An emergency service center (ESC) may remotely activate the monitoring devices, which, then, monitor the user's vicinity and report the monitored information to the ESC to enable the ESC personnel to plan appropriate response to the emergency at hand. The remote activation and control of a monitoring device may be accomplished via the Internet, in addition to regular communication networks (e.g., the PSTN or a cellular phone network). A fee-based emergency monitoring service may be offered to remotely monitor the subscriber's household or vicinity at the time of emergency. The remote monitoring of the subscriber's vicinity at the time of emergency is useful to expeditiously gauge the severity of the emergency, and, hence, to prepare an adequate response to help the subscriber needing emergency assistance.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method of monitoring a vicinity of a monitoring device, comprising:

receiving, at an emergency service center, an emergency help request;

directly connecting, via a carrier network, to the monitoring device;

querying the monitoring device to retrieve a capability associated with the monitoring device;

remotely activating the monitoring device; and remotely controlling the monitoring device to monitor the vicinity.

2. The method of claim 1, further comprising receiving device-specific information from the monitoring device.

3. The method of claim 1, wherein directly connecting, via a carrier network, to the monitoring device includes directly connecting, via one of the plain old telephone system (POTS), the public switched telephone network (PSTN), and a wireless communication network.

4. The method of claim 1, further comprising determining a parameter that the monitoring device can monitor.

5. The method of claim 1, wherein remotely controlling the monitoring device to monitor the vicinity includes remotely controlling the monitoring device to monitor the vicinity for a predetermined period of time.

6. The method of claim 1, further comprising activating a feature of the monitoring device.

7. The method of claim 1, wherein remotely controlling the monitoring device to monitor the vicinity includes remotely sending a command to the monitoring device.

8. The method of claim 1, further comprising receiving a uniform resource locator (URL) address of a website that contains device specific information regarding the monitoring device.

9. The method of claim 1, further comprising retrieving device-specific information regarding the monitoring device from a database.

10. The method of claim 1, further comprising determining whether the emergency service center is authorized to obtain information from the monitoring device.

11. The method of claim 10, wherein determining whether the emergency service center is authorized to obtain information from the monitoring device is performed prior to remotely activating the monitoring device.

12. The method of claim 10, wherein determining whether the emergency service center is authorized to obtain information from the monitoring device includes determining, by the monitoring device, whether the emergency service center is authorized to obtain information from the monitoring device.

13. An apparatus for monitoring a vicinity of a monitoring device, comprising:

means for receiving, at an emergency service center, an emergency help request;

means for directly connecting, via a carrier network, to the monitoring device;

means for querying the monitoring device to retrieve a capability associated with the monitoring device;

means for remotely activating the monitoring device; and means for remotely controlling the monitoring device to monitor the vicinity.

14. A remote monitoring system, comprising:

an emergency service center in communication with a carrier network; and a monitoring device directly connected to the emergency service center via the carrier network, wherein the monitoring device is configured to receive a query from the emergency service center and is further configured to be controlled by the emergency service center based on a capability retrieved from the monitoring device by the emergency service center in response to the query.

15. The system of claim 14, wherein the carrier network is one of the plain old telephone system (POTS), the public switched telephone network (PSTN), and a wireless network.

16. The system of claim 14, wherein the monitoring device is configured to receive an activation of a feature from the emergency service center.

17. The system of claim 14, wherein the emergency service center is in communication with the carrier network via one of a telephone line cable, an ISDN line, an ADSL line, an optical fibre link, a radio link, and a cable modem link.

18. The system of claim 14, wherein the monitoring device is in communication with the carrier network via one of a telephone line cable, an ISDN line, an ADSL line, an optical fibre link, a radio link, and a cable modem link.

19. The system of claim 14, wherein the monitoring device is selected from the group consisting of a fax machine with a built-in telephone, a video camera unit, a telephone answering machine, a digital camera, a computer with a built-in camera unit, and a telephone with a built-in video camera and a data port.

20. The system of claim 14, wherein the monitoring device is configured to determine whether the emergency service center is authorized to accept data from the monitoring device.

* * * * *